United States Patent
Adoni et al.

(10) Patent No.: US 11,256,470 B1
(45) Date of Patent: Feb. 22, 2022

(54) SOUND MANAGEMENT IN EDGELESS FLEXIBLE DISPLAY DEVICE

(71) Applicant: INTERNATIONAL BUSINESS MACHINES CORPORATION, Armonk, NY (US)

(72) Inventors: Siddique M. Adoni, Bangalore (IN); Sarbajit K. Rakshit, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/996,217

(22) Filed: Aug. 18, 2020

(51) Int. Cl.
*G06F 3/16* (2006.01)
*G06F 1/16* (2006.01)
*H04R 1/40* (2006.01)
*H04R 29/00* (2006.01)

(52) U.S. Cl.
CPC ............. *G06F 3/16* (2013.01); *G06F 1/1652* (2013.01); *H04R 1/403* (2013.01); *H04R 29/001* (2013.01); *H04R 2499/15* (2013.01)

(58) Field of Classification Search
CPC ......... G06F 3/16; G06F 1/1652; H04R 1/403; H04R 29/001; H04R 2499/15
USPC ........................................................ 381/59
See application file for complete search history.

(56) References Cited

U.S. PATENT DOCUMENTS

| | | | |
|---|---|---|---|
| 9,448,593 B2 | 9/2016 | Kim et al. | |
| 9,602,926 B1* | 3/2017 | Keen | H04R 1/323 |
| 10,416,723 B2 | 9/2019 | Song et al. | |
| 10,564,675 B2 | 2/2020 | Ka et al. | |
| 2017/0142508 A1* | 5/2017 | Prommersberger | H04R 1/02 |
| 2017/0228042 A1 | 8/2017 | Yu et al. | |
| 2017/0228210 A1 | 8/2017 | Yu et al. | |
| 2018/0217639 A1* | 8/2018 | Jones | G06F 1/1652 |
| 2021/0014591 A1* | 1/2021 | Kim | G06F 3/165 |

OTHER PUBLICATIONS

Mell et al., "The NIST Definition of Cloud Computing", Recommendations of the National Institute of Standards and Technology, NIST Special Publication 800-145, Sep. 2011, 7 pages.

Garg et al., "Rotating Camera Based on Speaker voice", International Journal of Advanced Research in Electrical, Electronics and Instrumentation Engineering, vol. 2, Issue 5, May 2013, pp. 1674-1681.

(Continued)

*Primary Examiner* — Vivian C Chin
*Assistant Examiner* — Friedrich Fahnert
(74) *Attorney, Agent, or Firm* — Robert D. Bean

(57) ABSTRACT

According to one embodiment, a method, computer system, and computer program product for operating a flexible device to maintain a threshold level of audio quality through various changes in the flexible device's bend profile is provided. The present invention may include identifying the bending profile of a flexible device comprising one or more audio devices; and responsive to identifying one or more of the audio devices as occluded audio devices based on the bending profile, operating the flexible device to change the position of one of the one or more occluded audio devices to raise an audio quality associated with the occluded audio device above the threshold level of desired audio quality.

20 Claims, 6 Drawing Sheets

(56) References Cited

OTHER PUBLICATIONS

Hager et al., "Handling Speaker Position Changes in a Meeting Diarization System By Combining DOA Clustering and Speaker Identification", NTT Corporation, Jan. 2008, 4 pages.
Orphanides, "Samsung is making a folding phone . . . but how will it work?", Wired, Sep. 4, 2018, 21 pages.
Patently Mobile, "Samsung Reveals a New Display for a Future Smartphone that could fold in half like a Wallet", Aug. 18, 2014, 7 pages.
Vanhemert, "This iPad Case Makes Real Buttons Rise Out of Your Keyboard", Wired, Feb. 12, 2015, 8 pages.

\* cited by examiner

SOUND MANAGEMENT IN EDGELESS FLEXIBLE DISPLAY DEVICE

BACKGROUND

The present invention relates, generally, to the field of computing, and more particularly to flexible display devices.

Cellular phones and other mobile computing devices have reached an incredible level of technological advancement; as a result, the industry has reached a point where improvements are growing smaller and more iterative. As such, there exists a need in the art for bold new innovations to revitalize the technological advancement of mobile computing devices. One such direction in which innovation is being sought is the field of flexible display devices; flexible display devices are simply electronic display devices capable of displaying dynamic digital images that are designed to be bent. Some devices have integrated hinges that allow the device to be folded at specific points, while others aspire to mimic the properties of paper. These flexible display devices promise to offer radical improvements in durability, portability, convenience, et cetera.

SUMMARY

According to one embodiment, a method, computer system, and computer program product for operating a flexible device to maintain a threshold level of audio quality through various changes in the flexible device's bend profile is provided. The present invention may include identifying the bending profile of a flexible device comprising one or more audio devices; and responsive to identifying one or more of the audio devices as occluded audio devices based on the bending profile, operating the flexible device to change the position of one of the one or more occluded audio devices to raise an audio quality associated with the occluded audio device above the threshold level of desired audio quality.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
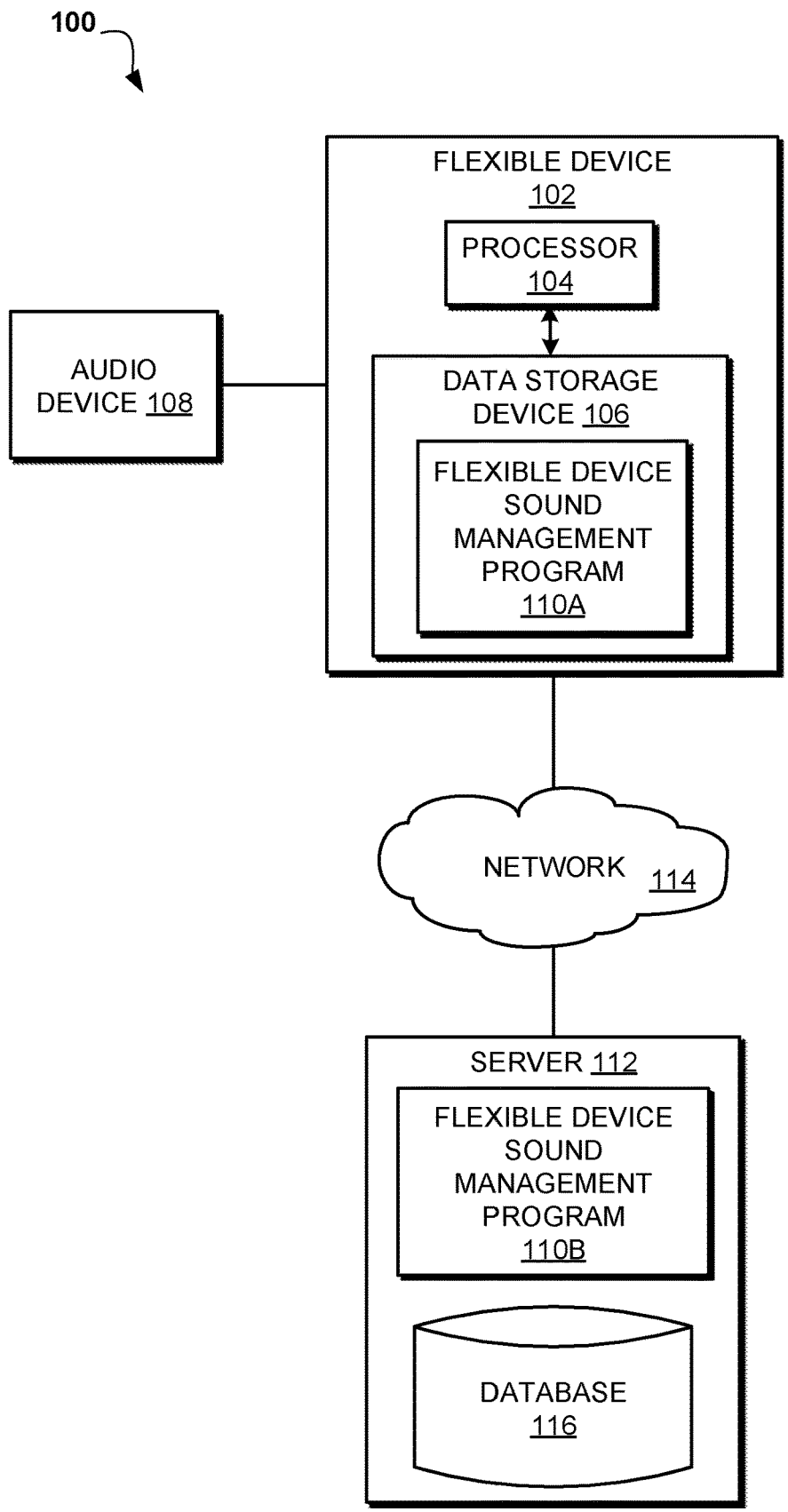
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to flexible display devices. The following described exemplary embodiments provide a system, method, and program product to, among other things, dynamically monitor and adapt to the bend profile of a flexible device to maintain audio quality. Therefore, the present embodiment has the capacity to improve the technical field of flexible display devices by enabling the flexible device to maintain a consistent level of sound quality in both recorded and broadcast audio even where the bend profile of the device results in the obstruction of microphones and speakers embedded in the device.

As previously described, cellular phones and other mobile computing devices have reached an incredible level of technological advancement; as a result, the industry has reached a point where improvements are growing smaller and more iterative. As such, there exists a need in the art for bold new innovations to revitalize the technological advancement of mobile computing devices. One such direction in which innovation is being sought is the field of flexible display devices; flexible display devices are simply electronic display devices capable of displaying dynamic digital images that are designed to be bent. Some devices have integrated hinges that allow the device to be folded at specific points, while others aspire to mimic the properties of paper. These flexible display devices promise to offer radical improvements in durability, portability, convenience, et cetera.

Flexible display devices can be folded, rolled, or bent in various ways according to the user's need. In some implementations, the overall dimension of the flexible display is comparatively larger, so that when the device is bent or folded, the dimensions can be reduced, and as per user's need can then be restored by un-bending the device. For example, a user may bend a flexible device at its midpoint into a 45-degree angle so that the device may be rested upright on a surface, halving the display dimensions. However, the introduction of flexibility to a display device introduces challenges that must be overcome before the potential of the flexible display device can be fully realized. In particular, the issue that bending a device may result in the occlusion or repositioning of speakers and microphones integrated into the flexible device such that the quality of sound recording or broadcasting is significantly degraded. As such, it may be advantageous to, among other things, implement a system that dynamically tracks the bending profile of a flexible device in relation to the position of microphones and speakers integrated into the device, and takes measures to mitigate or eliminate any adverse effect the bending profile may produce in the sound produced or recorded by the flexible device.

According to at least one embodiment, the invention is an apparatus comprising a flexible device equipped with one or more integrated audio devices, where each audio device is integrated with a microfluidics-enabled surface capable of repositioning the audio device to improve the auditory quality of captured or broadcast sound based on the bending profile of the flexible device.

According to at least one embodiment, the invention is a method of dynamically tracking the bending profile of the flexible device and altering properties of the audio devices to maintain sound quality.

In some embodiments, the bending profile may be a description of the position or form that the flexible device currently occupies, and in some embodiments may include the assumed direction of the user relative to the flexible device. In some embodiments, the bending profile may include the position of the audio devices on the flexible device and/or relative to the user and/or relative to the ground or other obstacles that could affect audio quality. In some embodiments, for example where the flexible device includes both speakers and microphones, the speakers may emit sound waves, such as an ultrasonic wave, and analyzing the return of the emitted sound wave to identify the shape, or bend profile, of the flexible device. In some embodiments, the flexible device may be equipped with any combination of sensors, such as piezoelectric sensors, mechanical switches, strain gauges, et cetera, to measure the shape of the device and by extension the bend profile. In some embodiments, the invention may use ultrasonic waves to map obstacles around the device, and/or to identify the location of a user. In some embodiments, the invention may assume that the user is facing the surface of the flexible device which is displaying or is equipped to display digital images. In some embodiments, for example where the flexible device has an integrated camera, the system may use object detection methods to identify objects near the device that may affect sound quality, and/or may use face detection methods or facial recognition methods to identify the location of the user relative to the device. In some embodiments, for example where the flexible device is equipped with multiple microphones, the flexible device may use acoustic location techniques and voice identification techniques to identify the origin of a user's voice, and thereby locate the user relative to the flexible device.

In some embodiments, for example where the flexible device is equipped with microphones, the system may record and/or analyze sound being produced by the flexible device to dynamically assess audio quality. This may include analyzing any number of parameters of the sound, such as loudness, frequency, et cetera as the sound is broadcast from speakers on the flexible device. From these parameters, the flexible device may derive the sound quality, which may be an assessment of the accuracy, fidelity, and/or intelligibility of the audio output from the flexible device.

In some embodiments, the system may, based on the bending profile of the display, identify audio devices that are compromised by the bending profile; in other words, audio devices that are acoustically occluded from the user, or are otherwise moved by the bending of the device and/or the device's location relative to obstacles into positions where the audio device cannot achieve the threshold level of audio quality. The system may deactivate compromised audio devices and record or play sound through non-compromised audio devices instead, where non-compromised audio devices are audio devices that have not been significantly compromised by the bending profile of the flexible device.

In some embodiments, the system may, based on the bending profile, activate microfluidics mechanisms corresponding to one or more compromised audio devices to reposition the compromised audio devices into orientations relative to the flexible device and/or the user and/or obstacles in the nearby environment where they are no longer compromised, or are less compromised, such that the sound quality exceeds the threshold level.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to dynamically monitor and adapt to the bend profile of a flexible device to maintain audio quality.

Referring to FIG. 1, an exemplary networked computer environment 100 is depicted, according to at least one embodiment. The networked computer environment 100 may include flexible device 102 and a server 112 interconnected via a communication network 114. According to at least one implementation, the networked computer environment 100 may include a plurality of flexible devices 102, audio devices 108, and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Flexible device 102 may include a processor 104 and a data storage device 106 that is enabled to host and run a flexible device sound management program 110A and communicate with the server 112 via the communication network 114, in accordance with one embodiment of the invention. Flexible device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 6, the flexible device 102 may include internal components 602a and external components 604a, respectively. In some embodiments, flexible device 102 may be flexible; flexible device 102, or components of flexible device 102, may be capable of bending or flexing between two or more forms, for instance by the use of hinges, or by flexible materials used in the construction of flexible device 102. In some embodiments, flexible device 102 may be operatively connected to devices that are flexible, for instance to a bendable or hinged display.

Audio device 108 may be any electronic device that is capable of recording or broadcasting audio waves, such as a microphone or speaker. Audio device 108 may be embedded into or otherwise integrated with flexible device 102, or a component thereof, such that occlusion of the audio device 108, such as by flexion of the flexible device 102 or component, or by an obstacle such as a table surface or pillow, may adversely affect the quality of the sound received by audio device 108 or broadcast by audio device 108 to the user. In some embodiments, at least one or more audio devices 108 may be equipped to broadcast and receive ultrasonic waves. In some embodiments, at least one audio device 108 may be mounted on or otherwise integrated with a microfluidics surface, such that the facing, position, height, et cetera of audio device 108 may be dynamically adjusted by the microfluidics mechanism comprising the microfluidics surface.

The server computer 112 may be a laptop computer, netbook computer, personal computer (PC), a desktop computer, or any programmable electronic device or any network of programmable electronic devices capable of hosting and running a flexible device sound management program 110B and a database 116 and communicating with the flexible device 102 via the communication network 114, in accordance with embodiments of the invention. As will be discussed with reference to FIG. 6, the server computer 112 may include internal components 602b and external components 604b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the flexible device sound management program 110A, 110B may be a program enabled to dynamically monitor and adapt to the bend profile of a flexible device to maintain audio quality. The flexible device sound management may be located on flexible device 102 or server 112 or on any other device located within network 114. Furthermore, flexible device sound management 110A, 110B may be distributed in its operation over multiple devices, such as flexible device 102 and server 112. The flexible device sound management method is explained in further detail below with respect to FIG. 2.

Figure 2:
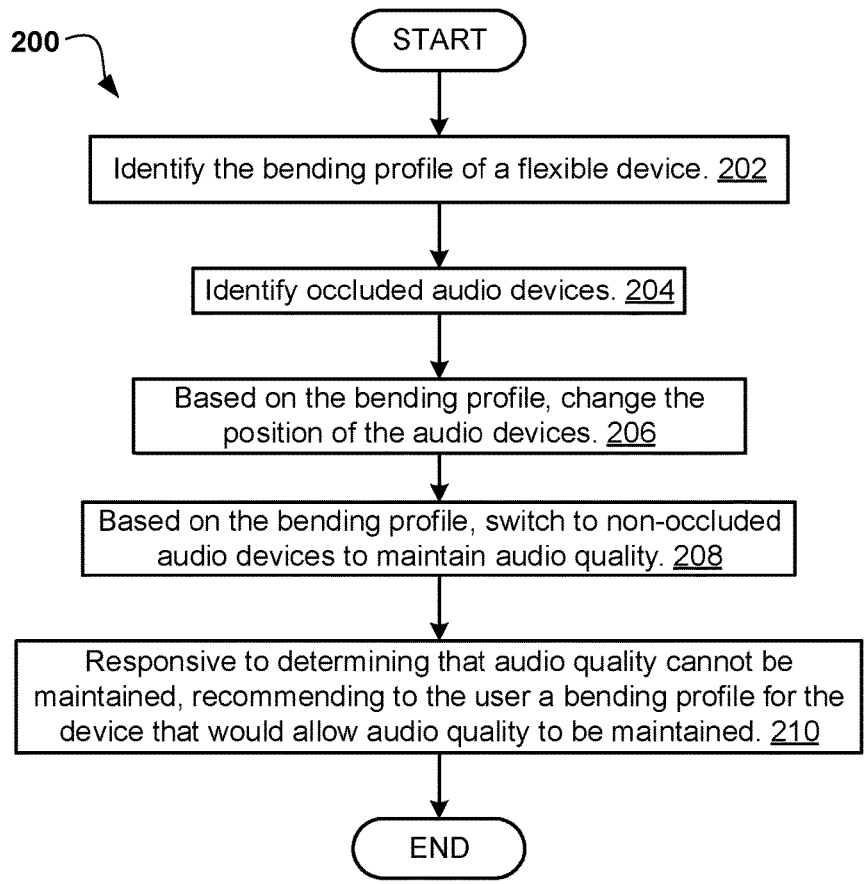
FIG. 2 is an operational flowchart illustrating a flexible device sound management process according to at least one embodiment.

Referring now to FIG. 2, an operational flowchart illustrating a flexible device sound management process 200 is depicted according to at least one embodiment. At 202, the flexible device sound management program 110A, 110B identifies the bending profile of a flexible device. The bending profile may be a description of the position or form that the flexible device 102 currently occupies. The flexible device sound management program 110A, 110B may identify the bending profile through any number or combination of means; for example where the flexible device 102 includes both speakers and microphones, the speakers may emit sound waves, such as an ultrasonic wave, and analyzing the return of the emitted sound wave to identify the shape, or bend profile, of the flexible device. In some embodiments, the flexible device may be equipped with any combination of sensors, such as piezoelectric sensors, mechanical switches, electrical resistance sensors, electrical contacts, strain gauges, et cetera, to measure flexion and/or hinged movement of the flexible device 102 and interpret the sensor data to identify the current shape and/or position of flexible device 102, and by extension the bend profile. In some embodiments, the sensors may include cameras, which use object detection methods to identify visual portions of the flexible device 102 within the camera feed to extrapolate a bend profile based on the location of the camera on flexible device 102. In some embodiments, flexible device sound management program 110A, 110B may dynamically monitor the bend profile of the flexible device 102 in real time or near real time.

At 204, flexible device sound management program 110A, 110B identifies occluded audio devices 108. An audio device 108 may be occluded if the audio device 108's function, for example playing audio in the case of a speaker or recording audio in the case of a microphone, is impaired by the presence of obstacles or the flexible device 102 itself which are interfering with the clear transmission of audio waves. The flexible device sound management program 110A, 110B may determine that a device is occluded via any number or combination of methods; for instance, in embodiments where audio devices 108 on the flexible device 102 comprise at least one microphone and one speaker capable of receiving and broadcasting ultrasound waves, flexible device sound management program 110A, 110B may determine whether an audio device 108 is occluded by emitting ultrasound waves and analyzing the waveform received back to measure the size and shape of the air column, where the air column is the empty space immediately surrounding the audio devices 108 through which audio waves may propagate clearly. The flexible device sound management program 110A, 110B may compare the size and shape of the measured air column against the dimensions of desired air columns which represent the minimum dimensions necessary to create an acoustic environment where audio device 108 can produce or record acceptable levels of audio quality. In some embodiments, an array of desired air columns may be provided that are tailored to represent the minimum acceptable acoustic environment for individual models or acoustic characteristics of audio devices 108. If the measured air column was smaller or proportioned differently than the desired air column, flexible device sound management program 110A, 110B may determine that the audio devices 108 are occluded. In some embodiments, for instance where there are multiple microphones and/or multiple speakers integrated into flexible device 102, the flexible device sound management program 110A, 110B may prioritize microphone/speaker pairs that are closest together on flexible device 102, such that the microphone/speaker pair is most likely to be within the same air column. In some embodiments, for example where there are multiple microphones and/or multiple speakers, flexible device sound management program 110A, 110B may cycle through any number of combinations of microphone and speaker to identify audio devices 108 that are located within the same air column.

In some embodiments, flexible device sound management program 110A, 110B may identify obstacles in contact with or proximate to the flexible device 102 to identify if any audio devices 108 are occluded. The flexible device sound management program 110A, 110B may use any number or combination of methods to identify objects; for example, flexible device sound management program 110A, 110B may use ultrasound to identify the air column, compare the air column against the bend profile of flexible device 102 to eliminate dimensions of the air column that are constrained by the surfaces of flexible device 102, and identify the presence of obstacles by the remaining constraints on the dimensions of the air column. In some embodiments, flexible device sound management program 110A, 110B may use a camera and machine vision techniques to identify obstacles within the video feed, or infer the presence of an obstacle by dark or occluded camera footage. The flexible device sound management program 110A, 110B may also use a position or movement sensor such as an accelerometer or gyroscope to identify the presence of the ground in relation to the flexible device 102, and may determine from lack of movement data that any audio devices 108 on the ground-facing surfaces of the flexible device 102 are likely to be occluded.

In some embodiments, flexible device sound management program 110A, 110B may identify the location of a user relative to the flexible device 102, for instance by using a camera and facial detection methods or facial recognition methods to identify the location of the user relative to the device based on visual data. In some embodiments, for example where the flexible device is equipped at least one microphone, the flexible device may use acoustic location techniques and voice identification techniques to identify the origin of a user's voice, and thereby locate the user relative to the flexible device. In some embodiments, for example where data on the location of a user is unavailable or unreliable, the flexible device sound management program 110A, 110B may assume the user is located in front of a surface of the flexible device 102 which is equipped to display media. In some embodiments, for example where a display surface of the flexible device 102 has been bent or folded such that the display surface is divided into sections or is facing more than one directions, flexible device sound management program 110A, 110B may assume that the user is in front of whichever section of the display surface is currently displaying media or has been played in the past when the flexible device 102 was in a similar bend profile. In some embodiments, for instance where the flexible device sound management program 110A, 110B identifies obstacles in contact with or proximate to the flexible device 102, the flexible device sound management program 110A, 110B may determine an audio device 108 to be occluded if there are obstacles between the audio device 108 and the user, and/or if the bend profile of the flexible device 102 results in the audio device 108 facing away from the user.

In some embodiments, for example where the audio devices 108 integrated into flexible device 102 comprise at least one speaker and at least one microphone, flexible device sound management program 110A, 110B may use the microphone to record the audio emitted from the speaker and analyze any number of parameters of the sound, such as volume, frequency, et cetera to derive the sound quality, which may be an assessment of the accuracy, fidelity, and/or intelligibility of the audio output from the flexible device. The flexible device sound management program 110A, 110B may compare the determined actual sound quality against a predetermined threshold of sound quality, where the threshold represents a desired level of sound quality. The desired sound quality may reflect any level of sound quality desired by a user, for example the minimum sound quality required for broadcast sound to be intelligible to a user, or a sound quality that reflects an optimal listening experience, et cetera. Where the broadcast or recorded sound quality of an audio device 108 does not exceed the threshold level of sound quality, flexible device sound management program 110A, 110B may determine the audio device 108 to be occluded. In some embodiments, for example where audio devices 108 comprise multiple speakers and at least one microphone, flexible device sound management program 110A, 110B may identify which speaker is producing the sound being recorded and analyzed for sound quality via, for example, directional audio techniques or relative volume of recorded sound based on known locations of audio devices 108 on the flexible device 102 in relation to the microphone. In some embodiments, such as where the distance of the user from the flexible device 102 is measured, the threshold value may be modified to take into account the volume or fidelity necessary to achieve the desired sound quality. In some embodiments, the flexible device sound management program 110A, 110B may measure sound quality at all times, or may measure sound quality only when audio device 108 is broadcasting or recording sound. In some embodiments, there may be a different threshold for received sound quality and broadcast sound quality.

In some embodiments, instead of or in addition to a binary determination of whether a given audio device 108 is occluded, flexible device sound management program 110A, 110B may assess a spectrum for each audio device 108 or group of audio devices 108 (such as a microphone/speaker pairing or where individual audio devices 108 cannot be specifically identified) of occlusion. For example, the spectrum may be a value assigned to each audio device 108 or group of audio devices 108 that represents the level of audio quality relative to other audio devices 108 that may be recorded and/or emitted by each audio device 108 or group of audio devices 108. This value of relative audio quality may be based on any number or combination of factors relevant to audio quality, such as the actual audio quality as measured by one or more microphones embedded in flexible device 102, and/or other factors such as the presence of obstacles, the dimensions of the air column and local acoustic conditions, the direction and distance of the user, technical characteristics of the individual audio devices 108, et cetera. In some embodiments, flexible device sound management program 110A, 110B may determine an audio device 108 to be occluded if its relative value of sound quality fails to exceed the threshold representing the desired level of audio quality.

At 206, flexible device sound management program 110A, 110B changes the position of the audio devices. Here, flexible device sound management program 110A, 110B uses a microfluidics mechanism upon which the audio devices 108 are mounted to reposition the occluded audio devices 108 so that they are no longer occluded, or to improve the sound quality that the audio device 108 records or broadcasts. The flexible device sound management program 110A, 110B may be pre-supplied with a list of configurations, either generic or tailored to the model or characteristics of flexible device 102 or individual audio devices 108, for the microfluidics mechanisms to produce improved sound in common situations. In some embodiments, such as where the flexible device sound management program 110A, 110B measures the air columns for the audio devices 108, the flexible device sound management program 110A, 110B may adjust the position of the audio device 108 to place it in a location or orientation where it achieves or is closer to a desired air column. For example, if audio device 108 is occluded because it is flush against a flat surface underneath flexible device 102 such as a table, flexible device sound management program 110A, 110B may engage a microfluidics mechanism to create a bubble off center from the audio device 108 such that the audio device 108 is located on the side of the bubble, and thereby pressing the ventral surface of the flexible device 102 up from the table, creating a small air column for audio device 108 to receive or broadcast audio. In some embodiments, for example where flexible device sound management program 110A, 110B detects objects or users, flexible device sound management program 110A, 110B may adjust the audio device 108 via the microfluidics surface to achieve direct or better line of sight towards a user, or to avoid objects. In some embodiments, flexible device sound management program 110A, 110B may monitor sound quality in real time or near real time while it adjusts the position of the audio device 108 via the microfluidics mechanism to identify and make adjustments that cause an improvement in audio quality. Use cases of the microfluidics mechanisms are explained in further detail below with respect to FIG. 5.

At 208, based on the bending profile, flexible device sound management program 110A, 110B switches to non-occluded audio devices to maintain audio quality. In some embodiments, such as where some audio devices are occluded and some are not, the flexible device sound management program 110A, 110B may disable one or more occluded audio devices 108, and play or record audio through one or more non-occluded audio devices 108. In some embodiments, for instance where flexible device sound management program 110A, 110B assesses a value of relative audio quality for some number of audio devices 108 or groups of audio devices 108, flexible device sound management program 110A, 110B may disable one or more audio devices 108 or groups of audio devices 108 where the relative audio quality of such devices fails to exceed the threshold representing the desired level of sound quality. In some embodiments, flexible device sound management program 110A, 110B may make a separate determination for microphones and a separate determination for speakers within audio devices 108.

At 210, responsive to determining that audio quality cannot be maintained, flexible device sound management program 110A, 110B recommends to the user a bending profile for the device that would allow audio quality to be maintained. For example, where flexible device sound management program 110A, 110B determines all audio devices 108 to be occluded, and/or where the actual sound quality of all audio devices 108, or all speakers within audio devices 108 or all microphones within audio devices 108, fall below the threshold representing the desired level of audio quality, flexible device sound management program 110A, 110B may determine that audio quality cannot be maintained. The flexible device sound management program 110A, 110B may search among one or more predetermined bending profiles of the flexible device 102, and may identify at least one bending profile that would place at least one audio device 108 in a non-occluded position, or where it could emit or record audio of a relative or actual audio quality so as to exceed the threshold value representing the desired level of audio quality. In some embodiments, flexible device sound management program 110A, 110B may select a bending profile based on a predetermined value representing a minimum number of audio devices 108, or a minimum number or combination of speakers and/or microphones, that must be non-occluded or exceed the threshold representing the desired level of quality in a predetermined bending profile. In some embodiments, flexible device sound management program 110A, 110B may choose a predetermined bending profile based on some number or combination of factors such as the direction and/or distance of the user from the flexible device 102, the presence and location of obstacles in contact with or proximate to flexible device 102, the actual sound quality and/or specifications associated with a given audio device 108, et cetera. The flexible device sound management program 110A, 110B may recommend a selected predetermined bending profile to the user by communicating the predetermined bending profile to the user in any number or combination of ways, such as by displaying the predetermined bending profile on the display or portion of the display facing the user, sending a text prompt, playing a video instructing the user on how to bend the flexible device 102 into the selected predetermined bending profile, playing an audio queue, et cetera.

Figure 3:
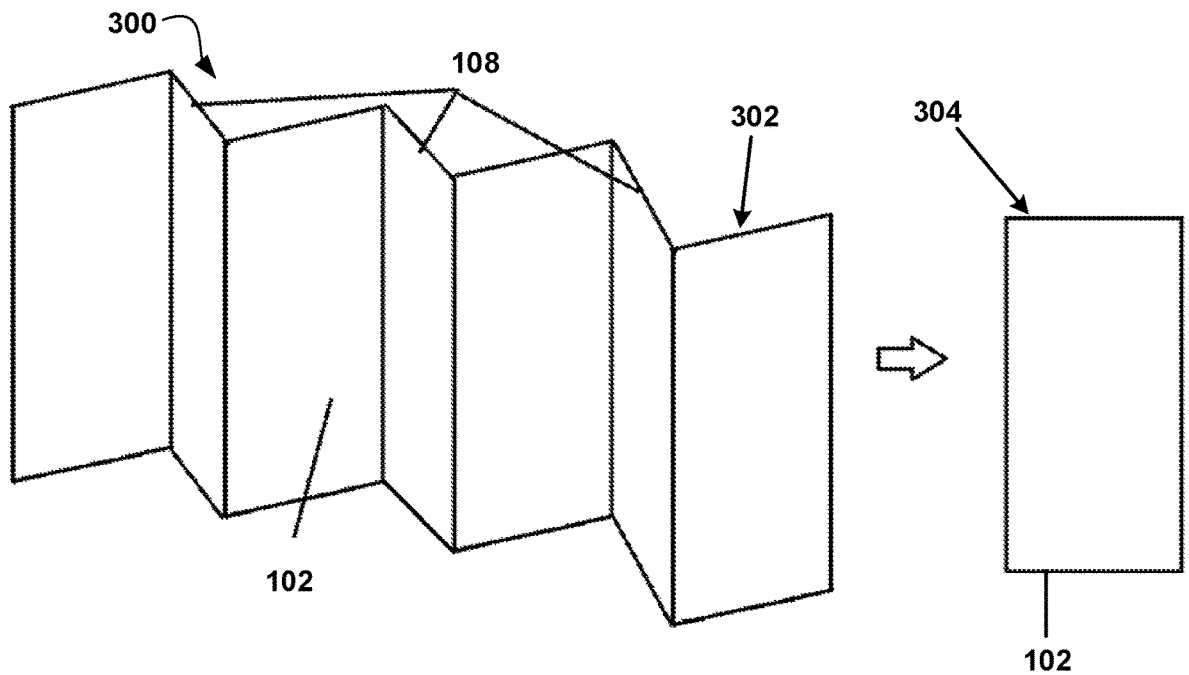
FIG. 3 illustrates an exemplary use case for a flexible device according to at least one embodiment.

Referring now to FIG. 3, an exemplary use case 300 for a flexible device 102 is illustrated according to at least one embodiment. Here, a flexible device 102 comprising audio devices 108 and which uses hinges at multiple points to bend according to the user's preference is displayed at 302 in an unfolded state; when flexible device 102 is bent into a folded state at 304, its audio devices 108 are pressed against opposing surfaces of flexible device 102 and therefore occluded, such that they will be unable to emit or record sound, or will do so in a significantly compromised fashion. In a situation such as 304, flexible device sound management program 110A, 110B may determine all audio devices 108 to be occluded, and determine that audio quality cannot be maintained in the current bending profile; flexible device sound management program 110A, 110B may then accordingly suggest to a user a bending profile that would leave one or more audio devices 108 with enough space to broadcast or record audio at a threshold level of quality, such as by unfolding the flexible device 102 enough to expose one or more audio devices 108.

Figure 4:
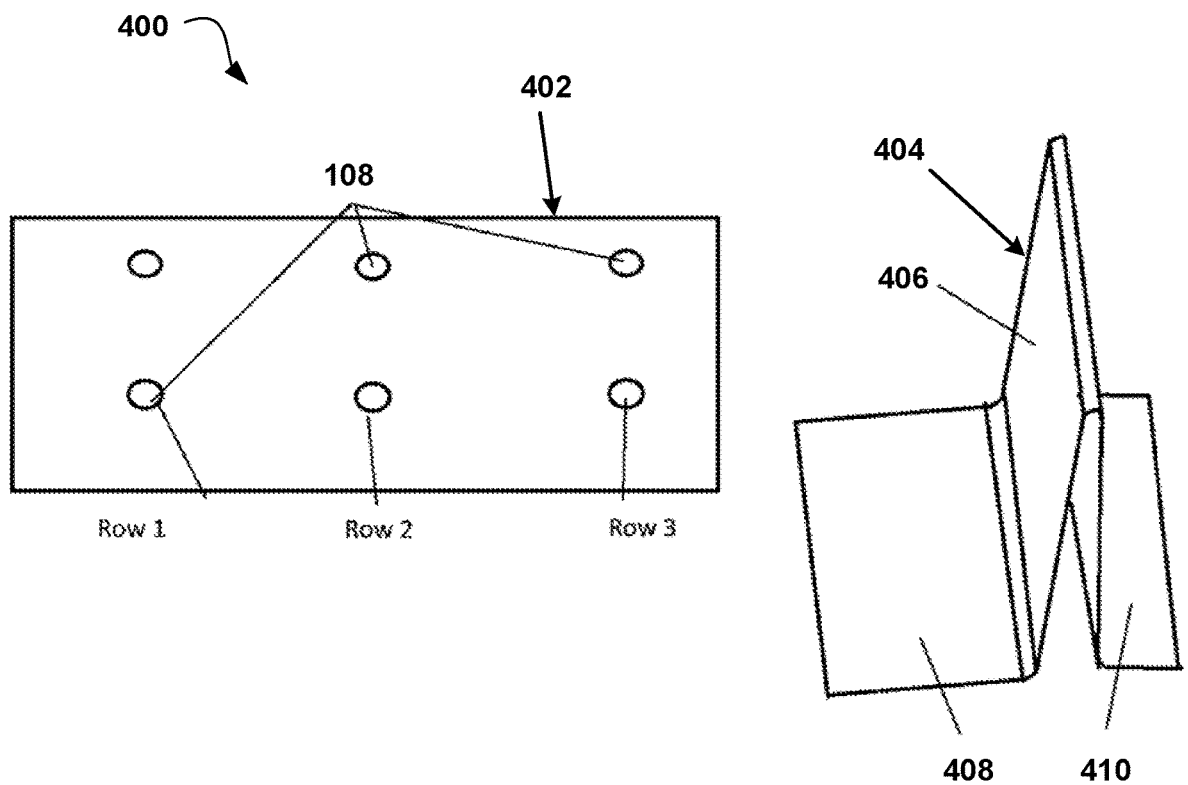
FIG. 4 illustrates an exemplary use case for a flexible device according to at least one embodiment.

Referring now to FIG. 4, an exemplary use case 400 for a flexible device 102 is depicted according to at least one embodiment. Flexible device 102 comprises three rows of audio devices 108: row 1, row 2, and row 3 respectively. Furthermore, according to the depicted embodiment, flexible device 102 is capable of being flexed or folded like paper. At 402, flexible device 102 is depicted in its un-bent state, lying flat on a table with rows of audio devices 108 facing upwards. At 404, flexible device 102 is depicted in a folded state, with surfaces 408 and 410 bent to align with the surface to provide a base to flexible device 102 and to support surface 406, which is facing the user and may comprise a display, or a subsection of the display upon which media is currently playing. At 404, the audio devices 108 of row 1 are underneath surface 408, pressed against the table; the audio devices 108 of row 2 are on the underside of surface 406, with little space between them and the opposing surface of flexible device 102, and the audio devices 108 of row 3 are on the underside of surface 410, pressed against the table in the same way as the audio devices 108 of row 1. In a situation such as 404, flexible device sound management program 110A, 110B may determine all audio devices 108 to be occluded except for the audio devices 108 of row 2, and may switch audio playback and recording to the audio devices 108 of row 2, and disable the audio devices 108 of row 1 and row 3. Alternatively or in addition, flexible device sound management program 110A, 110B may determine that the audio quality achieved by the audio devices 108 of row 2 does not exceed a threshold, for example because the amount of space between the surface 406 where the audio devices 108 of row 2 are located and the opposing surface of flexible device 102 is insufficient, flexible device sound management program 110A, 110B may determine that audio quality cannot be maintained in the current bending profile; flexible device sound management program 110A, 110B may then accordingly suggest to a user a bending profile that would leave one or more audio devices 108 with enough space to broadcast or record audio at a threshold level of quality, such as by unfolding the flexible device 102 enough to provide one or more audio devices 108 with enough space to provide or receive quality sound.

Figure 5:
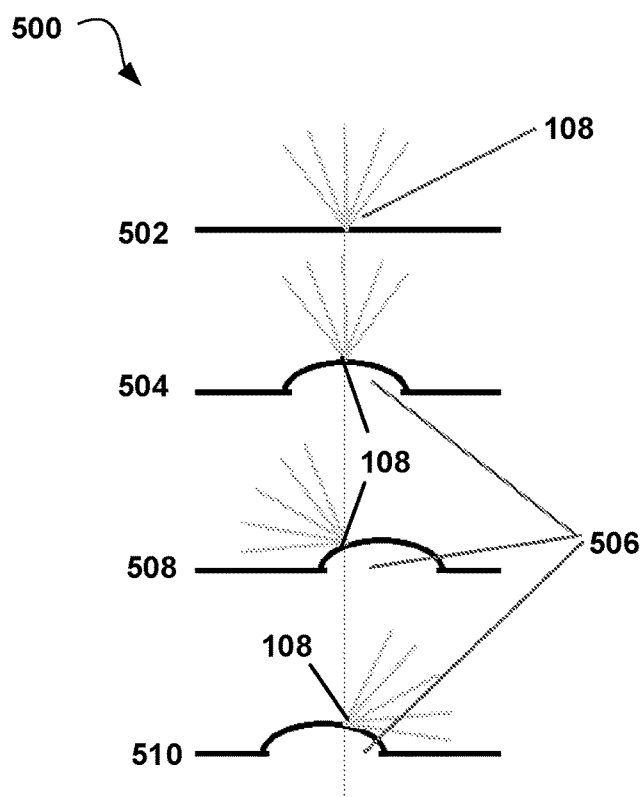
FIG. 5 illustrates an exemplary usage of microfluidics mechanisms within a flexible device according to at least one embodiment.

Referring now to FIG. 5, an exemplary usage 500 of microfluidics mechanisms within a flexible device 102 is depicted according to at least one embodiment. Here, a flexible device 102 is equipped with an audio device 108, which is depicted here as a speaker, and which is embedded upon a microfluidics surface. At 502, the microfluidics surface is not engaged, and the audio device 108 is broadcasting sound straight up. At 504, the microfluidics surface is engaged to create a bubble 506 which is centered under audio device 108 and repositions audio device 108 above the surface of flexible device 102. At 508, the microfluidics surface is engaged to create a microfluidics bubble 506 which is off-center to the right of audio device 108, such that audio device 108 is situated on the left side of microfluidics bubble 506 and angled to broadcast sound to the left. At 510, the microfluidics surface is engaged to create a microfluidics bubble 506 which is off-center to the left of audio device 108, such that audio device 108 is situated on the right side of microfluidics bubble 506 and angled to broadcast sound to the right. Based on the location of microfluidics bubble 506, the audio device 108 may be angled to direct (or receive, in some embodiments) sound in any direction. The size of the microfluidics bubble 506 may also be changed to alter the elevation or angle of the audio device 108.

It may be appreciated that FIGS. 2-5 provide only illustrations of individual implementations and do not imply any limitations with regard to how different embodiments may be implemented. Many modifications to the depicted environments may be made based on design and implementation requirements. For example, one skilled in the art would understand that while one threshold value representing a desired audio quality is used throughout the specification for simplicities' sake, any number of different thresholds may be used to add flexibility where the desired level of sound quality differs in differing situations.

Figure 6:
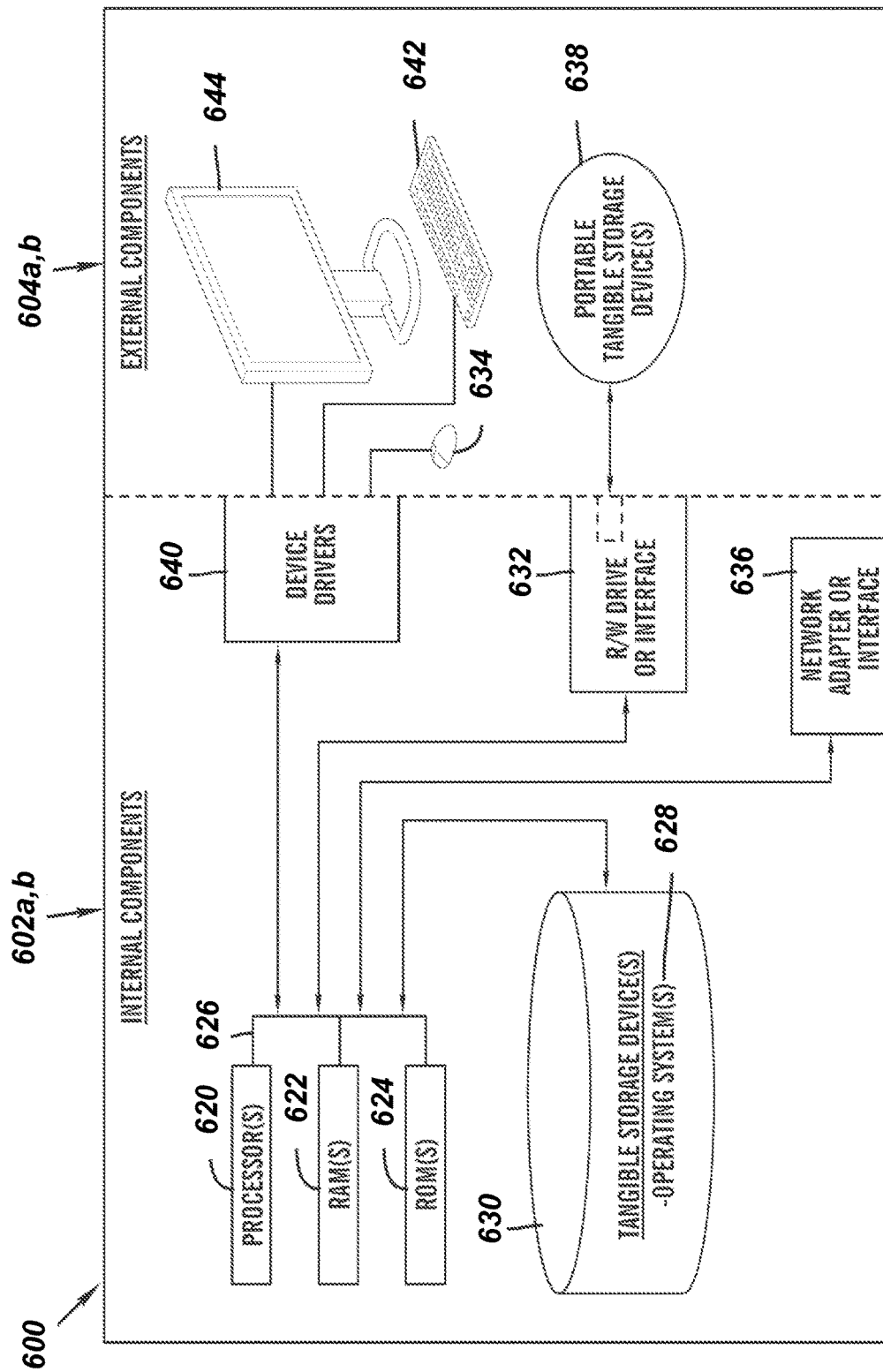
FIG. 6 is a block diagram of internal and external components of computers and servers depicted in FIG. 1 according to at least one embodiment.

FIG. 6 is a block diagram 600 of internal and external components of the flexible device 102 and the server 112 depicted in FIG. 1 in accordance with an embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

The data processing system 602, 604 is representative of any electronic device capable of executing machine-readable program instructions. The data processing system 602, 604 may be representative of a smart phone, a computer system, PDA, or other electronic devices. Examples of computing systems, environments, and/or configurations that may represented by the data processing system 602, 604 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The flexible device 102 and the server 112 may include respective sets of internal components 602a,b and external components 604a,b illustrated in FIG. 6. Each of the sets of internal components 602 include one or more processors 620, one or more computer-readable RAMs 622, and one or more computer-readable ROMs 624 on one or more buses 626, and one or more operating systems 628 and one or more computer-readable tangible storage devices 630. The one or more operating systems 628 and the flexible device sound management program 110A in the flexible device 102, and the flexible device sound management program 110B in the server 112 are stored on one or more of the respective computer-readable tangible storage devices 630 for execution by one or more of the respective processors 620 via one or more of the respective RAMs 622 (which typically include cache memory). In the embodiment illustrated in FIG. 6, each of the computer-readable tangible storage devices 630 is a magnetic disk storage device of an internal hard drive. Alternatively, each of the computer-readable tangible storage devices 630 is a semiconductor storage device such as ROM 624, EPROM, flash memory or any other computer-readable tangible storage device that can store a computer program and digital information.

Each set of internal components 602a,b also includes a R/W drive or interface 632 to read from and write to one or more portable computer-readable tangible storage devices 638 such as a CD-ROM, DVD, memory stick, magnetic tape, magnetic disk, optical disk or semiconductor storage device. A software program, such as the flexible device sound management program 110A, 110B, can be stored on one or more of the respective portable computer-readable tangible storage devices 638, read via the respective R/W drive or interface 632, and loaded into the respective hard drive 630.

Each set of internal components 602a,b also includes network adapters or interfaces 636 such as a TCP/IP adapter cards, wireless Wi-Fi interface cards, or 3G or 4G wireless interface cards or other wired or wireless communication links. The flexible device sound management program 110A in the flexible device 102 and the flexible device sound management program 110B in the server 112 can be downloaded to the flexible device 102 and the server 112 from an external computer via a network (for example, the Internet, a local area network or other, wide area network) and respective network adapters or interfaces 636. From the network adapters or interfaces 636, the flexible device sound management program 110A in the flexible device 102 and the flexible device sound management program 110B in the server 112 are loaded into the respective hard drive 630. The network may comprise copper wires, optical fibers, wireless transmission, routers, firewalls, switches, gateway computers and/or edge servers.

Each of the sets of external components 604a,b can include a computer display monitor 644, a keyboard 642, and a computer mouse 634. External components 604a,b can also include touch screens, virtual keyboards, touch pads, pointing devices, and other human interface devices. Each of the sets of internal components 602a,b also includes device drivers 640 to interface to computer display monitor 644, keyboard 642, and computer mouse 634. The device drivers 640, R/W drive or interface 632, and network adapter or interface 636 comprise hardware and software (stored in storage device 630 and/or ROM 624).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
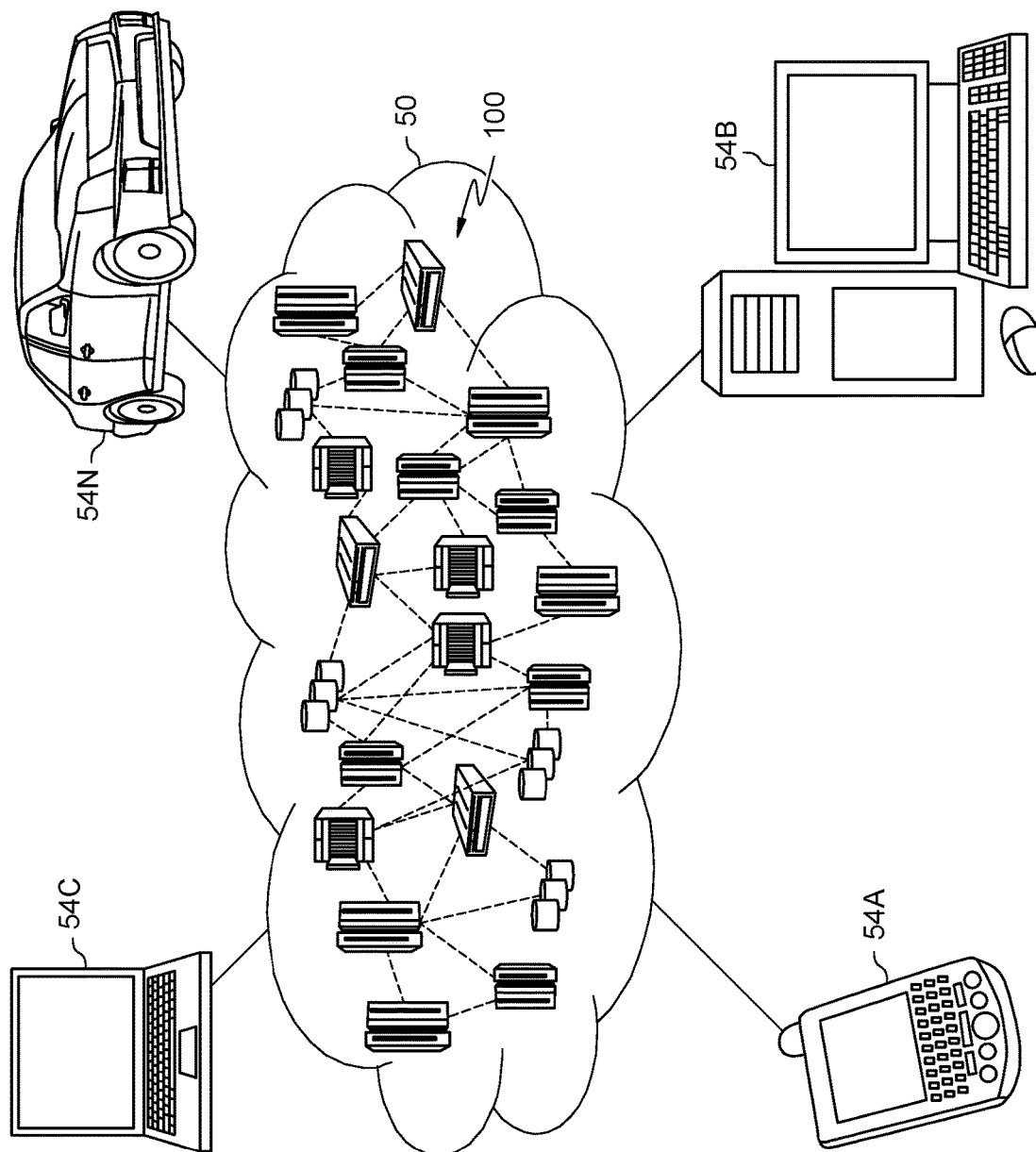
FIG. 7 depicts a cloud computing environment according to an embodiment of the present invention.

Referring now to FIG. 7, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 100 and cloud computing environment 50 can communicate with any type of computerized device over any type of network and/or network addressable connection (e.g., using a web browser).

Figure 8:
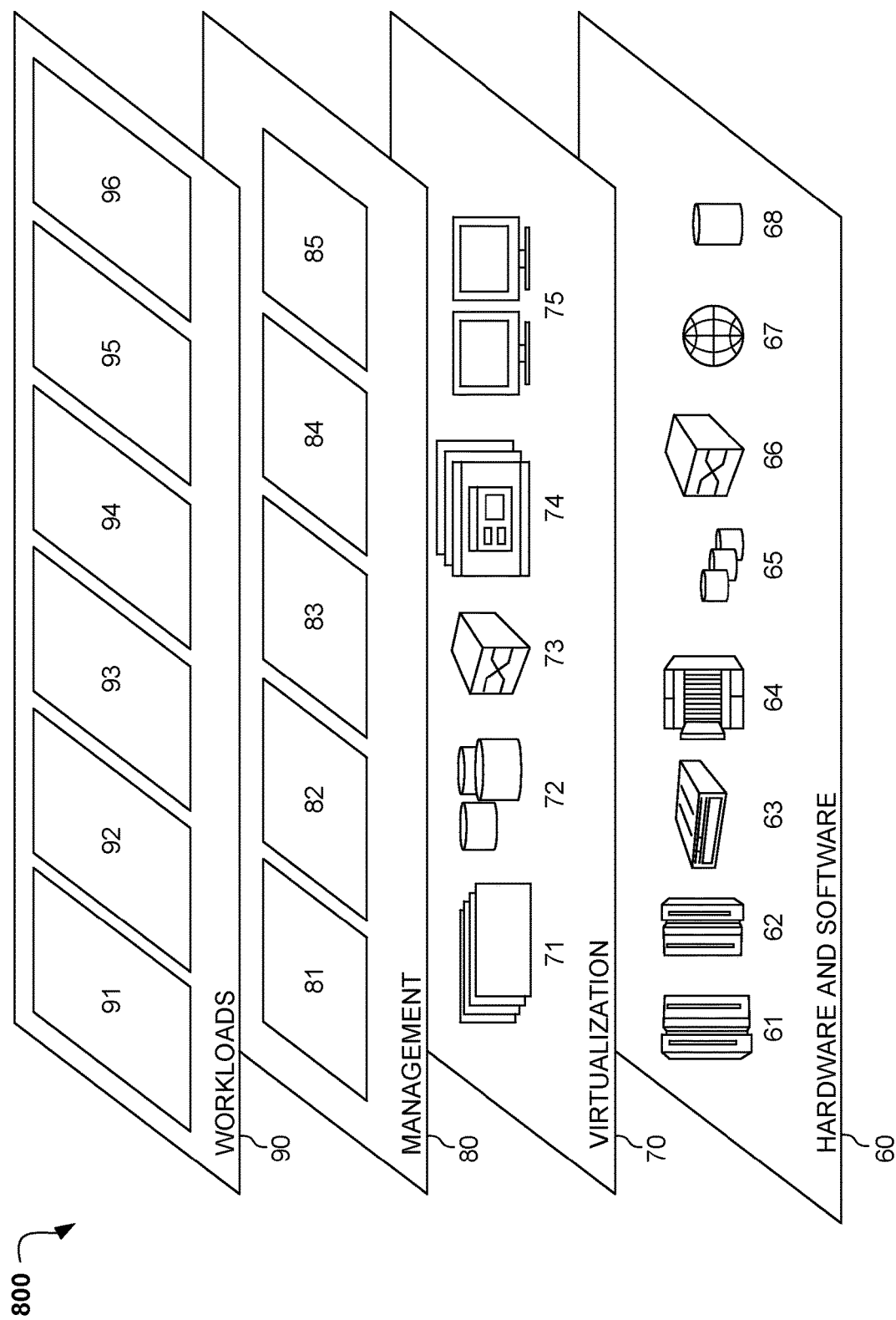
FIG. 8 depicts abstraction model layers according to an embodiment of the present invention.

Referring now to FIG. 8, a set of functional abstraction layers 800 provided by cloud computing environment 50 is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and flexible device sound management 96. The flexible device sound management 96 may be configured to dynamically monitor and adapt to the bend profile of a flexible device to maintain audio quality.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for operating a flexible device to exceed a threshold level of desired audio quality, the method comprising:
   identifying a bending profile of a flexible device comprising one or more audio devices;
   emitting one or more ultrasound waves from the occluded audio device;
   responsive to receiving one or more ultrasound waves, analyzing the one or more received ultrasound waves to measure an air column of the occluded audio device;
   responsive to identifying one or more of the audio devices as occluded audio devices based on the bending profile and the measured air column, operating the flexible device to reposition one of the one or more occluded audio devices to raise an audio quality associated with the occluded audio device above the threshold level.

2. The method of claim 1, wherein the flexible device further comprises one or more microfluidics surfaces within one or more of the audio devices.

3. The method of claim 1, further comprising:
   disabling one or more of the occluded audio devices.

4. The method of claim 1, wherein repositioning the one of the one or more occluded audio devices further comprises the steps of:
   based on the measured air column, repositioning the one or more occluded audio devices to achieve a desired air column.

5. The method of claim 1, wherein identifying an audio device as an occluded audio device is further based on:
   one or more detected obstacles in contact with or in proximity to the flexible device.

6. The method of claim 1, further comprising:
   responsive to determining that one or more of the audio devices cannot exceed the threshold level, recommending to a user a bending profile that enables one or more of the occluded audio devices to achieve an audio quality that exceeds the threshold level.

7. The method of claim 1, wherein identifying an audio device as an occluded audio device is further based on:
   a position of a user relative to a location of the audio device.

8. A computer system for operating a flexible device to exceed a threshold level of desired audio quality, the computer system comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   identifying a bending profile of a flexible device comprising one or more audio devices;
   emitting one or more ultrasound waves from the occluded audio device;
   responsive to receiving one or more ultrasound waves, analyzing the one or more received ultrasound waves to measure an air column of the occluded audio device; and
   responsive to identifying one or more of the audio devices as occluded audio devices based on the bending profile and the measured air column, operating the flexible device to reposition one of the one or more occluded audio devices to raise an audio quality associated with the occluded audio device above the threshold level.

9. The computer system of claim 8, wherein the flexible device further comprises one or more microfluidics surfaces within one or more of the audio devices.

10. The computer system of claim 8, further comprising:
    disabling one or more of the occluded audio devices.

11. The computer system of claim 8, wherein repositioning the one of the one or more occluded audio devices further comprises the steps of:
    based on the measured air column, repositioning the one or more occluded audio devices to achieve a desired air column.

12. The computer system of claim 8, wherein identifying an audio device as an occluded audio device is further based on:
    one or more detected obstacles in contact with or in proximity to the flexible device.

13. The computer system of claim 8, further comprising:
    responsive to determining that one or more of the audio devices cannot exceed the threshold level, recommending to a user a bending profile that enables one or more of the occluded audio devices to achieve an audio quality that exceeds the threshold level.

14. The computer system of claim 8, wherein identifying an audio device as an occluded audio device is further based on:
    a position of a user relative to a location of the audio device.

15. A computer program product for operating a flexible device to exceed a threshold level of desired audio quality, the computer program product comprising:
    one or more non-transitory computer-readable tangible storage medium and program instructions stored on at least one of the one or more tangible storage medium, the program instructions executable by a processor to cause the processor to perform a method comprising:
    identifying a bending profile of a flexible device comprising one or more audio devices;
    emitting one or more ultrasound waves from the occluded audio device;
    responsive to receiving one or more ultrasound waves, analyzing the one or more received ultrasound waves to measure an air column of the occluded audio device; and
    responsive to identifying one or more of the audio devices as occluded audio devices based on the bending profile and the measured air column, operating the flexible device to reposition one of the one or more occluded audio devices to raise an audio quality associated with the occluded audio device above the threshold level.

16. The computer program product of claim 15, wherein the flexible device further comprises one or more microfluidics surfaces integrated with one or more of the audio devices.

17. The computer program product of claim 15, further comprising:
   disabling one or more of the occluded audio devices.

18. The computer program product of claim 15, wherein repositioning the one of the one or more occluded audio devices further comprises the steps of:
   based on the measured air column, repositioning the one or more occluded audio devices to achieve a desired air column.

19. The computer program product of claim 15, wherein identifying an audio device as an occluded audio device is further based on:
   one or more detected obstacles in contact with or in proximity to the flexible device.

20. The computer program product of claim 15, further comprising:
   responsive to determining that one or more of the audio devices cannot exceed the threshold level, recommending to a user a bending profile that enables one or more of the occluded audio devices to achieve an audio quality that exceeds the threshold level.

* * * * *